United States Patent [19]
Zeller, Jr. et al.

[11] Patent Number: 4,750,170
[45] Date of Patent: Jun. 7, 1988

[54] LINE ACCESS APPARATUS FOR IN-BAND COMMUNICATION

[75] Inventors: David A. Zeller, Jr., Brookfield; Francisco A. Middleton; Franklin Hargrave, both of Newtown, all of Conn.

[73] Assignee: Alcatel USA Corporation, New York, N.Y.

[21] Appl. No.: 799,521

[22] Filed: Nov. 19, 1985

[51] Int. Cl.⁴ .................................................. H04J 1/14
[52] U.S. Cl. ........................................ 370/76; 375/36; 379/327
[58] Field of Search .......................... 370/30, 58, 76; 179/2 C, 98, 175.2 R, 175.2 C, 175.3 R, 2 DP; 333/194; 375/36; 340/310 CP; 361/119, 120; 379/325, 326, 327, 331

[56] References Cited
U.S. PATENT DOCUMENTS

| | | | |
|---|---|---|---|
| 2,009,438 | 7/1935 | Dunnley | 370/30 |
| 3,562,792 | 6/1968 | Berlincourt et al. | 333/187 |
| 3,860,769 | 1/1975 | Pachynski, Jr. | 179/175.3 R |
| 4,058,678 | 11/1977 | Dunn et al. | 340/310 CP |
| 4,529,904 | 7/1985 | Hattersley | 310/366 |
| 4,573,168 | 2/1986 | Henze et al. | 375/36 |
| 4,583,215 | 4/1986 | Hargrave et al. | 179/98 |
| 4,639,933 | 1/1987 | Howell et al. | 375/36 |

Primary Examiner—Michael A. Masinick
Assistant Examiner—Stephen Chin
Attorney, Agent, or Firm—Peter C. Van Der Sluys

[57] ABSTRACT

A line access apparatus for in-band communication includes a line coupler that functions as a high voltage isolation device and has a resonant frequency out of the signal transmission band. A carrier signal of about the resonant frequency is modulated at an in-band frequency to convey information across the line coupler.

9 Claims, 3 Drawing Sheets

LINE ACCESS APPARATUS FOR IN-BAND COMMUNICATION

BACKGROUND OF THE INVENTION

The present invention generally relates to a line access apparatus for in-band communication and, in particular, relates to such an apparatus including a high voltage isolating coupler and low voltage circuitry to interconnect a plurality of subscriber line pairs with a communication network.

The introduction of and continued demand for non-voice communication services is well recognized. As a result, entire non-voice communication networks have been developed to serve both the individual consumer and large users. In general, the provision of such services have taken two tacks. One tack being the provision of a separate and distinct communication system, the other tack being the expanded use of existing forms of communication. The provision of separate and distinct communication systems is, of course, expensive as it requires, inter alia, complete new wiring, whereas the use of existing forms of communication, most frequently telephone lines, requires techniques that do not interfere with existing voice services. The line access apparatus for in-band communication described and discussed hereinafter is directed to the latter tack.

Currently, the essential problems encountered when attempting to use existing telephony systems are twofold. The first problem is access and the second problem is the cost and reliability of equipment capable of functioning at the relatively high voltages required of telephone line circuits.

Existing telephony systems are composed of a number of switches, each switch serving a large number of telephone subscribers. These switches are geographically distributed and are generally referred to as "central office switches". Each central office switch has a main distribution frame (MDF) whereat each subscriber line pair served by that switch enters one side thereof. The subscriber line pairs are then routed through the MDF to the switch mechanism. This configuration is also found in smaller, usually privately owned, switches serving a rather geographically concentrated group of subscribers, such as, for example, a university campus. These smaller switches are generally referred to as private branch exchanges (PBXs). Regardless of the size, most telephone company switches are presently operating at near peak capacity. Because of the near peak capacity it would be impossible to provide each subscriber with a second pair of wires for non-voice communication via the MDF. Even if the capacity were available, the cost of the existing wiring militates against such an approach and massive disruption of existing voice communication would most likely occur. However, to make efficient use of existing communication lines, the MDF is clearly a most advantageous location to access a large number of subscriber lines. It is primarily for this reason that alternatives to rewiring an MDF have been developed for accessing existing subscriber lines.

One particular development is shown and described in U.S. patent applications Ser. Nos. 595,108 and 595,120 both filed on Mar. 30, 1984 and assigned to the assignee hereof. These applications are deemed incorporated herein by reference. In these referenced applications a main distribution frame access device is discussed and described. The MDF access device typically includes a plug-in unit that is inserted at the main distribution frame between the subscriber line termination points and the high voltage protection points. The use of such a device can provide immediate access to the subscriber pairs of wires within the main distribution frame without disturbing or disrupting the internal wiring thereof.

Such an access device is particularly useful in systems wherein additional services are to be provided via the subscriber lines, for example, for providing an auxiliary data switch or providing a remote meter reading system or other telemetry applications. Telemetry systems have been described and discussed in U.S. patent applications Ser. Nos. 648,542; 667,527 and 667,789 filed on Sept. 7, 1984, Nov. 2, 1984 and Nov. 2, 1984, respectively. These applications are assigned to the assignee hereof and deemed incorporated herein by reference. In such systems the main distribution frame access device can be used to provide access to the subscriber lines and connected, via a multiplexing means, to the data processing equipment of a utility company.

The second problem is implementing systems that make use of existing communication means is that telephone subscriber line circuits are designed to sustain comparatively high voltages, such as, for example, a −48 volts D.C. commonly used in the talking circuits thereof, as well as a superimposed 75 RMS A.C. ringing voltage. This voltage is conventionally provided by the central office battery and ringing generator, and exists intermittently on the subscriber lines when rung in response to a telephone call made thereto. In addition, for obvious reasons, telephone subscriber line circuits are also designed to survive lightning strikes and other high voltage transients.

The fact that such line circuits are subjected to and must sustain relatively high voltages is a detriment to adding auxiliary services at the MDF via a main distribution frame access plug. For example, when multiplexing/demultiplexing is performed at the MDF, high voltage large scale integrated circuits are presently required.

Currently, high voltage large scale integrated circuits, in addition to being expensive compared to low voltage large scale integrated circuits, are somewhat limited in both the manufacture and reliability thereof. Furthermore, currently available high voltage large scale integrated circuits are, themselves, extremely susceptible to high voltage transient signals and could exhibit catastrophic failure due to transients occurring at, or near, the main distribution frame.

Further, if an existing communication media has loaded or long subscriber lines the operating bandwidth thereof is often quite restricted. In the instance of telephone communication systems, the bandwidth is limited to the voice band. This places a further retriction on any auxilliary communication system in tandem therewith. Hence, to implement a system using such existing communication media the communication must be made within the operating bandwidth thereof, i.e., in-band.

Consequently, in order to take full advantage of the ability to access subscriber line pairs at a main distribution frame, it is highly desireable to isolate high voltage signals while, nevertheless, exchanging information with the subscriber lines.

SUMMARY OF THE INVENTION

Accordingly, it is one object of the present invention to provide a line access apparatus for in-band communication for use at a main distribution frame of a communication network.

This object is accomplished, at least in part, by an apparatus including a high voltage isolating means for accessing pairs of wires that are adapted to sustain comparatively high voltage thereacross.

Other objects and advantages will become apparent to those skilled in the art from the following detailed description read in conjunction with the appended claims and the drawings attached hereto.

DETAILED DESCRIPTION OF THE INVENTION

Figure 1:
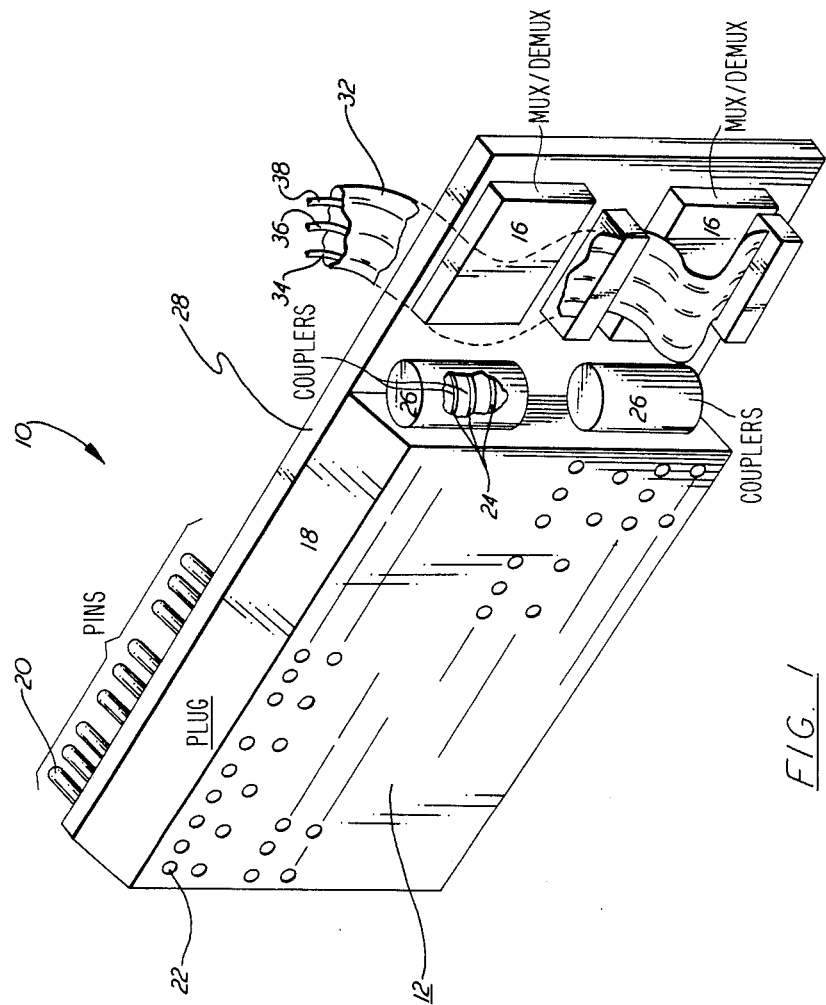
FIG. 1 is a perspective view, not drawn to scale, of a line access apparatus for in-band communication embodying the principles of the present invention.

A line access apparatus for in-band communication, generally indicated at 10 in FIG. 1 and embodying the principles of the present invention, includes means 12 for accessing a plurality of subscriber lines, means 14 for intercepting a plurality of subscriber lines via the line access means 12 and means 16 for multiplexing/demultiplexing signals from/to the subscriber lines.

In one embodiment, the subscriber line access means 12 includes a plug 18 adapted to be inserted between the main distribution frame, not shown in FIG. 1, and a plurality of high voltage protector blocks not shown in the drawings. The plug 18 includes a plurality of pins 20 extending through openings 22 in the plug 18. Each subscriber line pair is bridged by a pair of the pins 20. The pins 20, in addition to being continuous through the plug 18 are also connected to the subscriber line bridging means 14. The bridging connection can be made using known techniques in the connector industry and essentially includes a means 15 for connecting to a transmit side of the means 16 and a means 17 for connecting to a receive side of the means 16.

Figure 2:
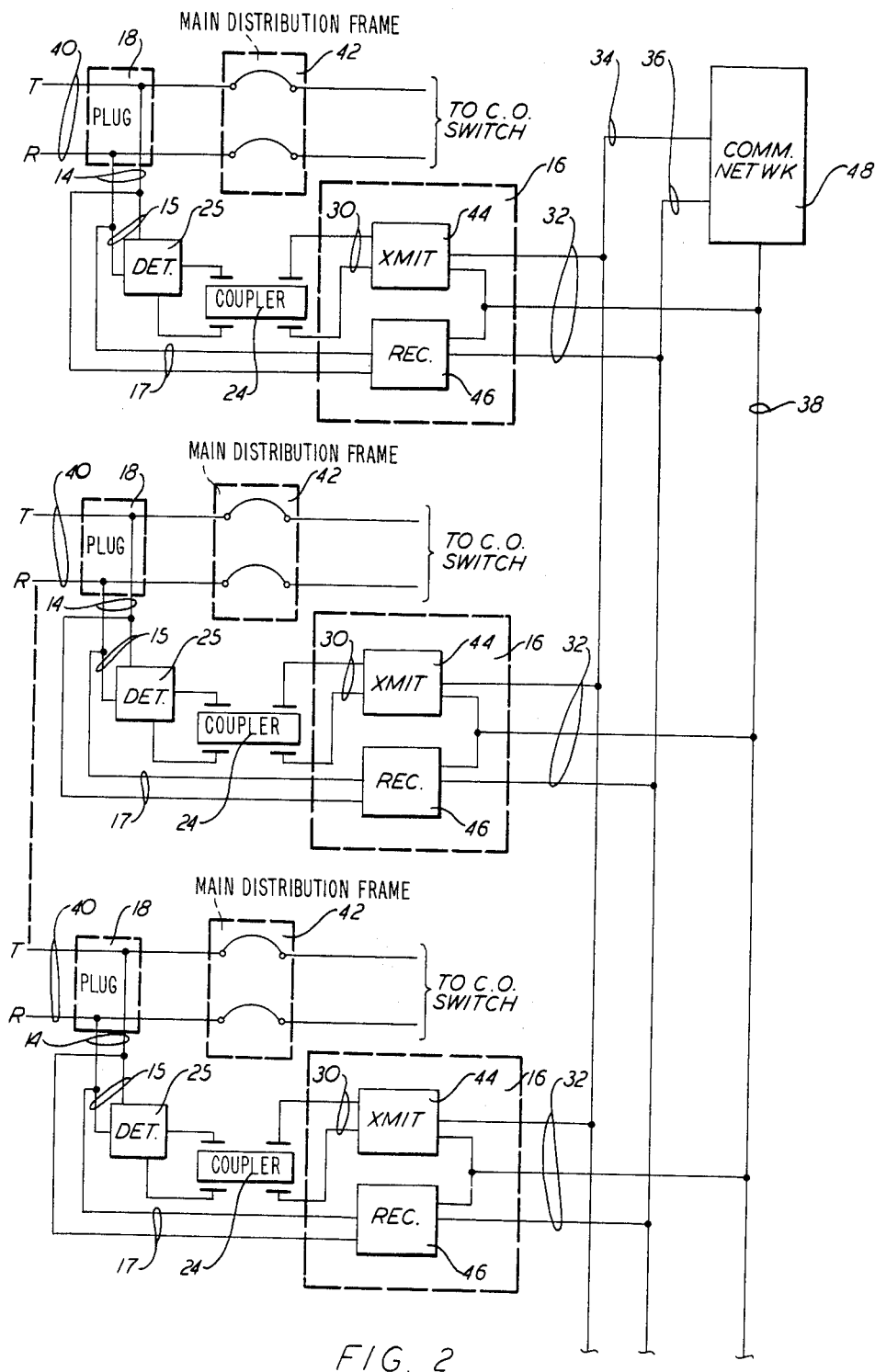
FIG. 2 is a block diagram of the line access apparatus for in-band communication shown in FIG. 1.
Figure 3:
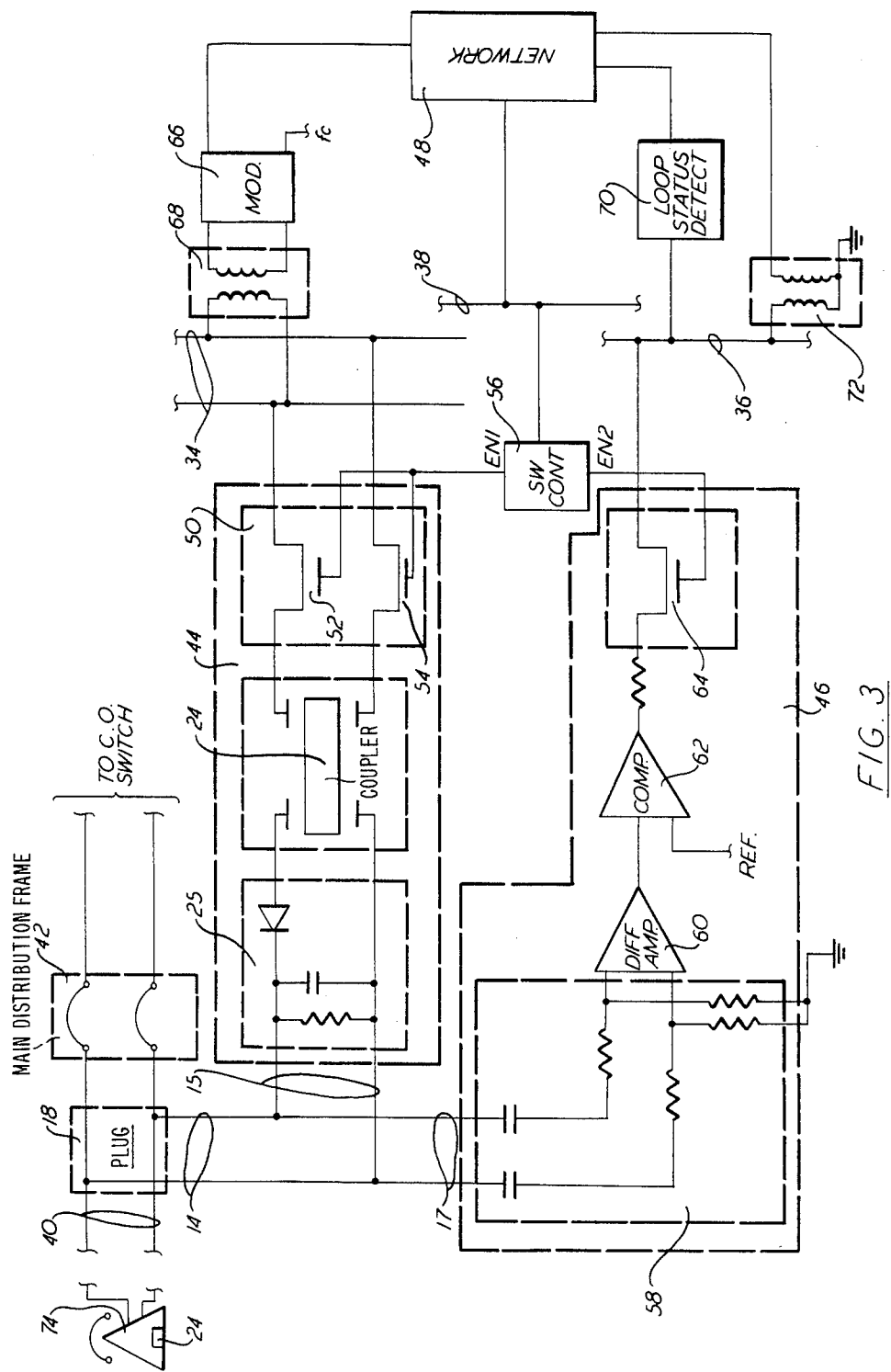
FIG. 3 is a circuit diagram of a portion of the apparatus shown in FIG. 2.

Preferably, the subscriber line access means 12 is provided in accordance with the main distribution frame access device shown and described in the above referenced U.S. patent application Ser. Nos. 595,108 and 595,120. Essentially, the use of the access means 12 allows the bridging of all of the subscribers line pairs that terminate at, for example, a selected telephone central office switch. Each subscriber line pair can then be selectively accessed via the bridging means 14 at the main distribution frame as desired. In a preferred embodiment, the means 14 for bridging to the subscriber lines includes, on the transmit side thereof, a plurality of a piezoelectric coupling devices 24. Preferably, the devices 24 are stacked and retained by a containment means 26 that allows the devices 24 to be positioned therewithin. The means 26 can be formed using known fabrication techniques. Further, the means 26 can be mounted on a base member 28 that can be integrally attached to the plug 18. Preferably, the means 26 is disposed proximate the plug 18 and includes a plurality of pairs of wires 30 extending therefrom. The pairs of wires 30 are, as more fully discussed below and as shown in FIGS. 2 and 3, connected to the means 16 for multiplexing/demultiplexing signals from/to subscriber lines. In the preferred enbodiment, the number of devices 24 in each containment means 26 is at least equal to the number of sets of pins 20 in the plug 18 associated therewith.

One device 24 particularly adaptable for use in the apparatus 10 is shown and described in U.S. Pat. No. 4,529,904 issued to Hattersley on July 16, 1985 and assigned to International Standard Electric Corp. This application is deemed incorporated herein by reference.

In general, the device described therein as adapted for use in the device 10, provides the means 24 for coupling a low voltage electronic circuit to a subscriber line adapated to sustain a relatively high voltage, such as a −48 volts DC. Such a piezoelectric device 24 allows signals to be transferred thereacross only in a relatively narrow bandwidth about the resonant frequency of the piezoelectric disk. Further, such a piezoelectric disk is capable of withstanding high voltages, i.e., 2000 to 4000 volts. Hence, the piezoelectric device 24 is both a high voltage isolating device and a signal coupler. Such a coupling device 24 is inexpensive and physically small. Consequently, a plurality of lines can be coupled in an extremely small space such that, for example, the multiplexing/demultiplexing means 16 can be located at the main distribution frame of a central office switch as well as be fabricated using low voltage circuitry elements.

A signal demodulator 25 shown in FIGS. 2 and 3, is electrically connected between the coupling device 24 and the means 15. As more fully discussed below, the signal demodulator 25 removes the high frequency carrier signal from the output of the coupling device 24 thus leaving an in-band signal.

The means 16 for multiplexing/demultiplexing signals from/to subscriber line preferably includes a low voltage large scale integrated circuit having the plurality of pairs of wires 30 from the coupling device 24 at one terminus thereof, the means 17 at a seocnd terminus thereof, and a multiplexed bus 32 at another terminus thereof. In the preferred embodiment, the multiplexed bus 32 is time-division multiplexed (TDM) and includes a transmit bus 34, a receive bus 36 and a control bus 38. As known, the transmit bus 34 and the receive bus 36 could be combined into a single bus although a more rapid exchange of information is achievable with the separated buses, 34 and 36, if, as more fully discussed below, separate transmit and receive circuitry is provided. The provision of such separate circuitry is within the state of the art of low voltage integrated circuits. Naturally, if physical space becomes a very limiting consideration then a single TDM bus could be used. However, this usually entails a rather more complicated signal control scheme. In fact, the specific implementation of the multiplexed bus 32 is a matter of design choice and other multiplexing/demultiplexing techniques can be used.

In one embodiment, shown in FIG. 2, the plug 18, although depicted as a plurality of separate elements, has a plurality of subscriber pairs 40, commonly referred to as tip (T) and ring (R) in telephony, connecting into the single plug 18. As shown, the plug 18 is, in this embodiment, on the subscriber side of the main distribution frame 42.

Each piezoelectric coupling device 24 is connected, via the signal demodulator 25 and the means 15, to a subscriber pair 40 on one side thereof and is connected, on the other side, to the means 16 having, for each piezoelectric device 24, a means 44 for transmitting a signal to the subscriber pair 40. A means 46 for receiving a signal from the subscriber pair 40 is also connected. As more fully discussed below, the transmit and receive means, 44 and 46, respectively, communicate with a communication network 48 via the transmit and receive busses, 34 and 36, respectively. Preferably, all needed control signals are provided to the means 16 from the network 48 via the control bus 38.

In one particular embodiment, the piezoelectric coupling device 24 is designed to have a resonant frequency of about 144 kilohertz. The resonant frequency of such a piezoelectric disk is determined not only by the material of the disk itself but the diameter, thickness and position of the electrodes connected thereto. These particular parameters can be determined and selected by techniques well known in the art. The coupling device 24 thus functions as a band pass filter passing only signals of 144 kilocycles and a surrounding narrow bandwidth. Hence, voice and other signals including D.C. carried on the subscriber pairs 40 do not pass through the device 24 to the means 16. Thus, the device 24 serves not only as a coupling device but as a high voltage isolating device as well.

In one particular embodiment, as shown in FIG. 3, each of the means 44 for transmitting to the subscriber pairs 40 from, for example, the communications network 48, includes the signal demodulator 25, the coupling means 24 and means 50, for enabling the transmission to the subscriber pairs 40. Preferably, the enablement means, 50 includes a pair of switches, 52 and 54, having inputs from a control means 56 that provides, in effect, clock, counter switch control functions.

The receive means 46 includes a high voltage isolator 58, a differential amplifier 60 for amplifying signals from the isolator 58, a comparator amplifier 62 that receives the output signals from the differential amplifier 60 and converts them to a digital output against a standardizing reference signal. The output from the comparator 62 is directed to the receive bus 36 via a switch 64 enabled by the control means 56.

In addition, a modulator 66 is included between the network 48 and the transmit bus 34 via an isolator transformer 68 and a subscriber loop status detector 70 is included between the receive bus 36 and the network 48. The receive bus 36 provides signals to the network 48 via an isolator transformer 72.

Operationally, information is directed to the modulator 66 from the network 48 where in the carrier signal, at the resonant frequency of the coupling means 24 is modulated with the signal information. The modulated carrier is impressed, via the isolating transformer 68 onto the transmit bus 34. The switch controller 56 clocks the TDM signal from the bus 34 by enabling the switches, 52 and 54, at the appropriate time slot. The modulated signal is then passed across the coupling device 24 and the carrier signal is removed there from by the signal demodulator 25. The in-band signal is then propagated along the subscriber pair of wires 40.

When no active transmission is occurring the receive means 46 is enabled and the status of activity on the subscriber pair 40 is monitored by the loop status detector 70. In order to avoid collisions, the network 48 via the detector 70 determines if a signal is present on the subscriber pair 40. A signal detected by the differential amplifier 60 has the output thereof measured against a convenient reference of the comparator amplifier 62.

The reference level is set to allow the passage of all signals on the pair 40 thereacross. The switch 64, as stated, is preferably enabled except when digitized information from the comparator 62 is injected into the appropriate time slot on the TDM receive bus 36 via the isolating transformer 72.

In one specific discrete element implementation the low voltage switches, 52, 54 and 64, can be CD4097B CMOS devices manufactured and marketed by RCA, Corp. of Somerville, N.J. The switch means 56 can be CD4067B or CD4015B manufactured and marketed by RCA, Corp. of Somerville, N.J., the modulator 66 can be a CA3054 marketed and manufactured by RCA, Corp. of Somerville, N.J. The remainder of the elements not specified immediately above are available as off-the-shelf items.

Although the above described discrete device implementation is readily available and functional, it is preferred that the means 16 be implemented via a low voltage CMOS large scale integrated circuit.

In one particular arrangement, an apparatus 10, in addition to being associated with an MDF access plug 18, is located at each subscriber subset 74 for the extraction of the digitized signals that are then routed to a data device either directly or via a modem. Advantageously, the particular coupling device 24 and the resultant ability to use low voltage large scale integrated circuitry allows the data extraction at the subscriber premises to be located either within the telephone subset 74 or at any other convenient place.

Another advantage of the apparatus 10 described herein is that it can be made physically small and thus readily used as a multiplexer/demultiplexer at the main distribution frame of a telephone central office, or PBX, without damage or extended disruption of existing voice services. In addition, it is inexpensive and readily implemented by, for example, the use of presently available low voltage CMOS large scale integrated circuit technology.

Although the present invention has been described herein with respect to a specific embodiment it will be understood that other arrangements and configurations may also be developed that nevertheless, do not depart from the spirit and scope of the present invention. Hence, the present invention is deemed limited only by the appended claims and the reasonable interpretation thereof.

We claim:

1. Apparatus for providing in-band communication, said apparatus comprises:

a voice communication system including a communication medium having a predetermined operating bandwidth;

a high voltage isolating piezoelectric coupling device, said piezoelectric coupling device having a resonant frequency outside of said predetermined operating bandwidth;

means for modulating a carrier signal with an information signal having a frequency within said operating bandwith, said carrier signal modulating means being connected to one side of said piezoelectric coupling device, said carrier signal having a frequency about equal to said resonant frequency of said piezoelectric coupling device whereby said information signal can be conveyed across said piezoelectric coupling device with said carrier signal; and means, between said piezoelectric coupling device and said communication medium, for connecting said piezoelectric coupling device to said communication medium and for removing said carrier signal whereby only said information signal is injected onto said communication medium.

2. Apparatus as claimed in claim 1 further comprising:

means for monitoring the activity on said communication medium.

3. Apparatus as claimed in claim 2 further comprises:

means for enabling said information to be injected onto said communication medium, said enabling means being enabled only if said communication medium is inactive.

4. Apparatus as claimed in claim 3 further comprises:

means for receiving information from said communication medium; and means for disabling said receiving means, said receiving means being disabled when said information injection means is enabled.

5. Apparatus for providing in-band communication, said apparatus comprises:

a voice communication system including a communication medium having a predetermined operating bandwidth said communication medium including a plurality of subscriber lines, each said line having a pair of wires;

a plurality of high voltage isolating piezoelectric coupling devices, said piezoelectric coupling devices having a resonant frequency outside of said predetermined operating bandwith;

means for modulating a carrier signal with an information signal having a frequency within said operating bandwidth;

means for selectively connecting said carrier signal modulating means to one side of one of said piezoelectric coupling devices, said carrier signal having a frequency about equal to said resonant frequency of said piezoelectric coupling devices whereby said information signal can be conveyed across said piezoelectic coupling devices with said carrier signal; and means, between each said piezoelectric coupling device and said communication medium, for connecting each said piezoelectric coupling device to a subscriber line and for removing said carrier signal whereby only said information signal is injected onto the subscriber lines of said communication medium.

6. Apparatus as claimed in claim 5, wherein said means for connecting comprises:

an access plus having a plurality of sets of pins associated therewith, said pins being connected to said subscriber lines.

7. Apparatus as claimed in claim 5, wherein said means for connecting and removing comprises:

a plurality of demodulators, each said demodulator being between one of said piezoelectric devices and said subscriber line associated therewith.

8. Apparatus as claimed in claim 7 further comprising:

a transmit TDM bus connected to said carrier modulating means, said selectively connecting means having an input thereof connected to said transmit TDM bus; and means, associated with each said subscriber line, for receiving information therefrom.

9. Apparatus as claimed in claim 8 further comprising:

means for providing high voltage isolation between each said receiving means and said subscriber line associated therewith.

* * * * *